United States Patent [19]
Ettes

[11] Patent Number: 5,859,524
[45] Date of Patent: Jan. 12, 1999

[54] POWER SUPPLY SYSTEM FOR AN APPARATUS WITH RECHARGEABLE BATTERIES, AND POWER SUPPLY UNIT AND APPARATUS FOR SUCH A POWER SUPPLY SYSTEM

[75] Inventor: Wilhelmus G. M. Ettes, Drachten, Netherlands

[73] Assignee: U.S. Philips Corporation, New York, N.Y.

[21] Appl. No.: 877,378

[22] Filed: Jun. 17, 1997

[30] Foreign Application Priority Data

Jun. 21, 1996 [EP] European Pat. Off. .............. 96201734

[51] Int. Cl.$^6$ .................................................. H01M 10/46
[52] U.S. Cl. ........................................... 320/132; 320/114
[58] Field of Search ...................... 320/113, 114, 320/115, 125, 128, 132, 149, 152, 160, 162, 163, 101, 110, 121, 129, 138, 142, 147, DIG. 21

[56] References Cited

U.S. PATENT DOCUMENTS

| | | |
|---|---|---|
| 4,775,827 | 10/1988 | Ijntema et al. . |
| 4,910,654 | 3/1990 | Forge ........................................ 363/49 |
| 5,206,097 | 4/1993 | Burns et al. ........................ 320/114 X |
| 5,254,931 | 10/1993 | Martensson .............................. 320/114 |

*Primary Examiner*—Edward H. Tso
*Attorney, Agent, or Firm*—Ernestine C. Bartlett

[57] ABSTRACT

A power supply system for an apparatus (SVR) with a rechargeable battery (B) has its power supply unit (PSU) coupled to the apparatus (SVR) by a two-wire connection (PSA/SVA; PSB/SVB). The power supply unit (PSU) having a flyback converter (DCC) with a transformer (TR) which supplies the battery (B) with charging current. The converter (DCC) is stopped periodically during breaks in which the apparatus (SVR) applies a status signal (STS) to the power supply unit via the two-wire connection. The power supply unit detects the status signal by means of a status detector (STD) and depending on the meaning of the status signal it switches the converter to another value of the charging current. When the battery (B) is full, which is detected by a battery management unit (BMU), or when the charging current is too large, which is detected by a comparator (CMP) and a current-sensing resistor (R2), it is thus possible to switch from fast charging to trickle charging. By way of status signal the apparatus (SVR) supplies a voltage pulse to an auxiliary winding (Ls2) of the transformer (TR) by temporarily short-circuiting a rectifier diode (D5) in the secondary circuit by a switching transistor (T) during the current supply breaks.

10 Claims, 6 Drawing Sheets

POWER SUPPLY SYSTEM FOR AN APPARATUS WITH RECHARGEABLE BATTERIES, AND POWER SUPPLY UNIT AND APPARATUS FOR SUCH A POWER SUPPLY SYSTEM

BACKGROUND OF THE INVENTION

The invention relates to a power supply system comprising: an apparatus with a rechargeable battery, and a power supply unit with a switched-mode power supply, which power supply unit can be coupled to the apparatus to supply current to the apparatus.

The invention also relates to a power supply unit and to an apparatus with a rechargeable battery for such a power supply system.

Such a power supply system is known, inter alia, from U.S. Pat. No. 4,775,827. In this known power supply system the power supply unit comprises a DC-DC converter, which converts the rectified mains voltage into a low direct voltage with which the battery of the apparatus is charged. In order to obtain greater design freedom there is a trend to provide a physical separation between the power supply unit and the apparatus, the power supply unit being constructed as an adapter which can be plugged into the wall outlet of the mains and the rechargeable apparatus being coupled to the adapter by a cord. Moreover, it is desirable that the power supply unit can rapidly charge the battery of the apparatus. However, this involves the risk that the battery is overloaded and becomes defective In order to preclude this, the apparatus should be capable in some way or another of communicating to the power supply unit that the battery is full and that charging should be stopped and should be continued with a safe small charging current, also referred to as trickle charging current. This communication capability requires a communication channel between the apparatus and the power supply unit. This communication channel requires additional wires in the connecting cord.

SUMMARY OF THE INVENTION

It is an object of the invention to provide a simple power supply system by means of which power supply and communication are possible. To this end, the power supply system of the type defined in the opening paragraph is characterized in that the power supply unit comprises means for stopping the switched-mode power supply during breaks in which no current is supplied to the apparatus; the apparatus comprises means for detecting the breaks in the current supply and means for transmitting a status signal to the power supply unit during the breaks; and the power supply unit comprises means for detecting the status signal during the breaks and means for changing the current intensity of the current in response to the status signal.

The communication between the apparatus and the power supply unit is effected during breaks introduced in which the power supply unit does not supply current to the apparatus. In these breaks the apparatus transmits a status signal to the power supply unit, the value, form or content of said status signal indicating the charging condition of the battery. Thus, the power supply unit can adapt the charging current to the charging condition of the battery. Since power supply and communication are spaced in time, they can both be effected via the same wires of the connecting cord. Therefore, this cord requires only two wires, which has the advantage that such a cord is more flexible and cheaper than a three-wire or multi-wire cord and, in addition, there is a wider variety of two-wire plug/inlet combinations at the apparatus side.

The switched-mode power supply in the power supply unit can be of any suitable type. An embodiment of the power supply system in accordance with the invention is characterized in that the switched-mode power supply comprises a flyback converter with a transformer, of which transformer a secondary winding can be coupled to at least the rechargeable battery via a rectifier diode. The flyback configuration is suitable for the comparatively low power drawn from the mains. The transformer provides adaptation between the comparatively high mains voltage and the comparatively low battery voltage and permits a safe electrical isolation between the apparatus and the mains voltage. The apparatus then need no longer comply with stringent safety requirements, as a result of which a greater freedom in the design of the apparatus is obtained. Besides, it becomes thus possible, if legislation prescribes this for environmental reasons, to remove the rechargeable batteries safely without the risk of coming into contact with any parts carrying mains voltage.

For the generation of the status signal an embodiment of the power supply system in accordance with the invention is characterized in that the apparatus comprises an electronic switch for short-circuiting the rectifier diode during the breaks in order to generate a pulse by way of status signal. During the breaks the switched-mode power supply in the power supply unit is idle. When in such a break the rectifier diode in the secondary circuit is short-circuited by the electronic switch, the battery voltage is applied to the secondary winding. The transformer transmits the voltage pulse to the primary winding or to an auxiliary winding, where it is detected by the means for detection in the power supply unit. The communication between the apparatus and the power supply unit is thus brought about by transmitting or not transmitting a pulse to the power supply unit during the breaks. When a pulse is received the power supply unit switches the current intensity of the average current to another value. If no pulse is received during a break the power supply unit continues to supply the same current. By switching between two current intensities it is possible to obtain an average current for charging the battery.

As regards the response to the status signal, an embodiment of the power supply system in accordance with the invention is characterized in that the flyback converter is adapted to supply a comparatively small current after detection of the pulse and to supply a comparatively large current in the absence of the pulse. When the battery is in the fully discharged condition the apparatus cannot generate a pulse. The power supply unit then does not detect any pulses during the breaks. If in this situation the choice is made to supply the comparatively large charging current, it is achieved that an empty battery is charged rapidly when the power supply system is started.

In order to preclude an excessive charging current an embodiment of the power supply system is characterized in that the apparatus comprises means for measuring an average current to the battery and means for activating the electronic switch when the average value exceeds a threshold value. As soon as the average charging current becomes too large, the apparatus activates the electronic switch during the next break and a pulse is applied to the power supply unit, as result of which the power supply unit changes over to a smaller current in the interval between the present break and the next break. If after this interval the average current is still too large, another pulse is transmitted in the break following this interval. This continues until the average value has become smaller than the threshold value, after which the transmission of pulses is stopped. The power supply unit then switches back to a larger charging current.

In order to prevent the battery from being overcharged, an embodiment of the power supply system is characterized in that the apparatus comprises means for measuring a charging condition of the battery and means for activating the electronic switch when a predetermined value of the charging condition is reached. As soon as the battery is full the charging should be stopped or should be continued with a safe small current intensity. The means for measuring the charging condition can be implemented as a simple battery voltage measurement device or as a complex battery management system as known, inter alia, from the aforementioned U.S. Pat. No. 4,775,827. When the battery is full, the electronic switch is activated in each break and a pulse is transmitted to the power supply unit, which is thus always forced to supply the comparatively small current to the battery after each break. The comparatively small current is preferably adequate for trickle-charging of the battery, whereas the comparatively large current is preferably adequate for rapid charging of the battery.

The power supply system in accordance with the invention is suitable for a variety of apparatuses with rechargeable batteries that are charged from the mains voltage. The power supply system is particularly suitable for rechargeable shavers. A large number of electronic components which are otherwise accommodated in the shaver housing can now be transferred to the adapter, while the customary two-wire cord can be maintained.

BRIEF DESCRIPTION OF THE DRAWINGS

These and other aspects of the invention will now be described and elucidated with reference to the accompanying drawings, in which.

DESCRIPTION OF THE PREFERRED EMBODIMENTS

Figure 1:
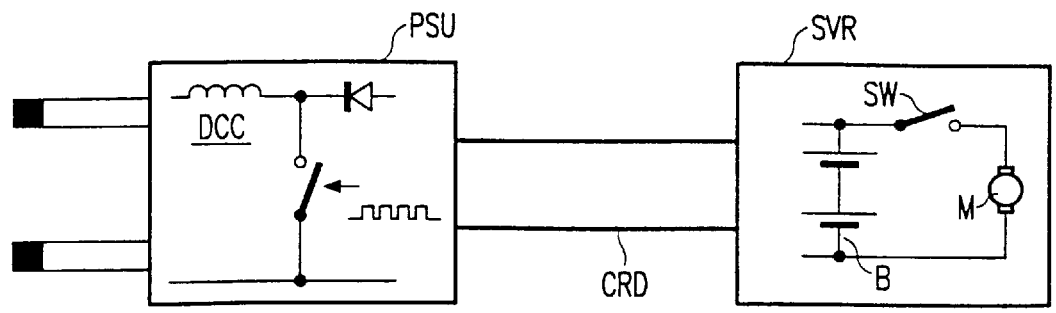
FIG. 1 is a block diagram of a power supply system in accordance with the invention.

FIG. 1 shows a block diagram of a power supply system in accordance with the invention. The power supply system comprises a power supply unit PSU which includes a switched-mode power supply DCC, also referred to as a DC-DC converter, and an apparatus SVR, for which a rechargeable shaver has been chosen by way of example. Hereinafter, the apparatus SVR will be referred to as "shaver", but it will be evident that this can be any other apparatus with rechargeable batteries. The shaver SVR includes a rechargeable battery B, for example of the NiCd (Nickel-Cadmium) or NiMH (Nickel-Metal Hydride) type, which may comprise one or more cells in series and/or in parallel, depending on the required capacity and voltage. The shaver SVR inter alia comprises a motor M, which is connected to the battery B via an on/off switch SW. The power supply unit PSU and the shaver SVR can be connected to one another by means of a two-wire cord CRD to charge the battery B of the shaver SVR by means of the power supply unit PSU, which for this purpose is plugged into a wall outlet of the a.c. mains. A two-wire cord is cheap, flexible and provides a wide choice of two-wire plug/inlet combinations at the shaver side. During charging of the battery B a charging current flows from the power supply unit PSU to the shaver SVR through the cord CRD. Charging of the battery B should be stopped when the battery B is full, in order to preclude overcharging. Moreover, the magnitude of the charging current should be controlled somehow or other during charging. Since the power supply unit PSU and the battery B are physically separated from one another by a two-wire cord the same two wires should in some way or another allow communication from the shaver SVR to the power supply unit PSU to provide information about the degree of charging of the battery B and the magnitude of the charging current. According to the invention, a communication protocol has been provided, the communication from the shaver SVR to the power supply unit PSU being time-multiplexed with the supply of charging current from the power supply unit PSU to the shaver SVR. In accordance with this protocol the battery is charged for some time; subsequently, the transmission of power is interrupted for some time during a break. In this break communication takes place, after which power transmission is resumed until the next break. The breaks succeed one another in accordance with a fixed pattern, while in the intervals between the breaks the power supply unit PSU supplies a charging current whose magnitude depends on a status signal which is transmitted from the shaver SVR to the power supply unit PSU during the breaks. In view of this protocol the switched-mode power supply DCC, as will be described in more detail hereinafter, includes means for stopping the switched-mode power supply during the breaks in which no current is supplied to the shaver SVR. The shaver SVR further comprises means for detecting the breaks in the current supply and means for transmitting a status signal to the power supply unit PSU during the breaks. The power supply unit PSU further comprises means for detecting the status signal during the breaks and means for changing the current intensity of the charging current in response to the status signal.

The switched-mode power supply DCC may be of any desired type, such as the forward (buck) converter, the flyback (buck-boost) converter and the like. When the power supply unit PSU comprises a transformer the shaver SVR is no longer regarded as a mains-powered apparatus and the approval and safety requirements imposed on the haver SVR will be less severe or are not imposed at all. This provides a greater freedom in the design of the shaver SVR. Moreover, the transformer makes it simply possible to meet the requirement that the rechargeable batteries should be removable from the shaver SVR in a simple and safe manner. To meet this requirement a flyback converter with a transformer has been selected as the switched-mode power supply DCC. The functional diagram of this converter is shown in FIG. 2, the general operation of the power supply system based on a flyback converter with a transformer being explained with reference to this Figure.

Figure 2:
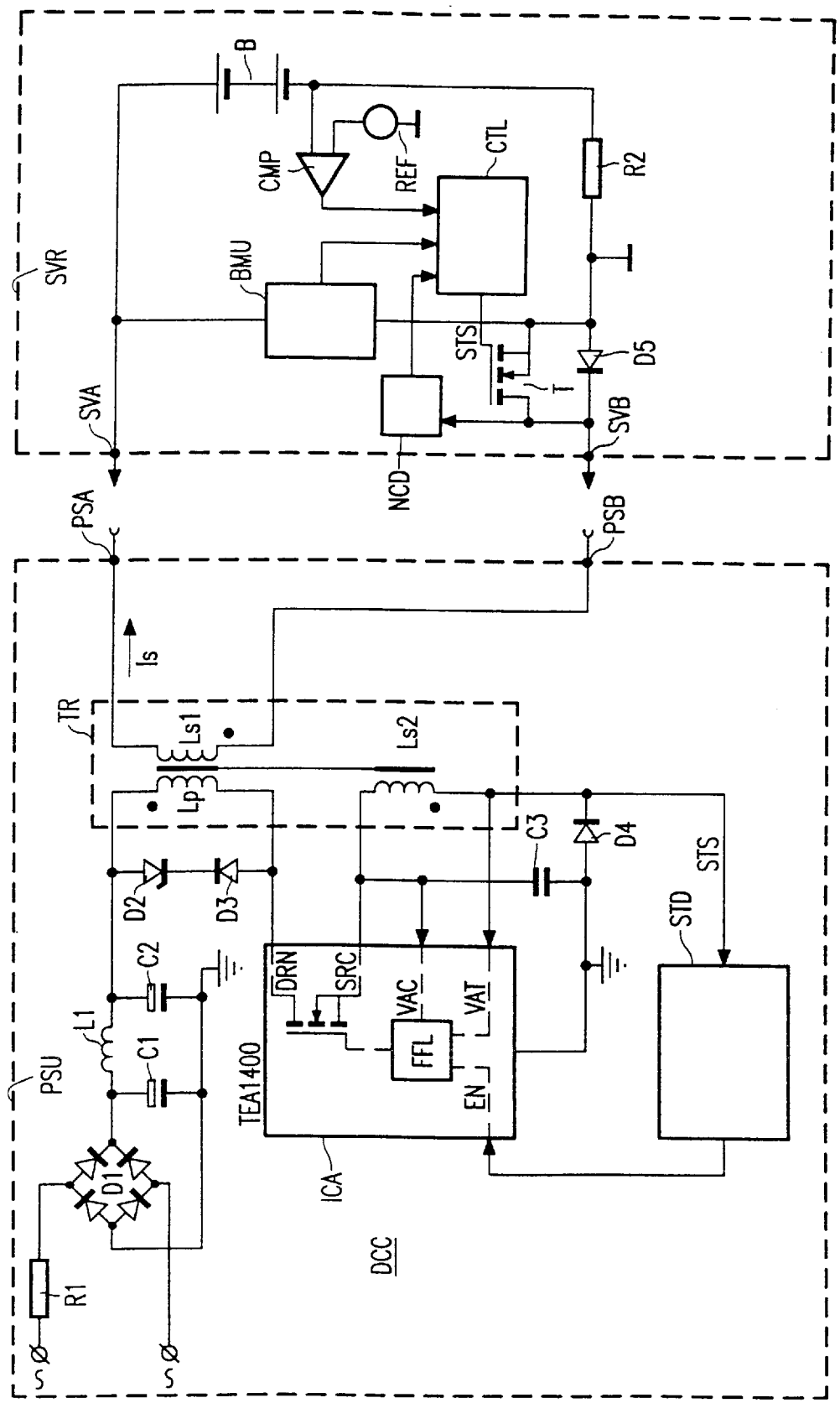
FIG. 2 shows a functional circuit diagram of an embodiment of a power supply system in accordance with the invention, comprising a power supply unit and an apparatus with a rechargeable battery.

The power supply unit PSU in FIG. 2 comprises a mains voltage rectifier D1 and a smoothing filter C1, L1, C2. The flyback converter converts a direct voltage appearing across the capacitor C2 into a low direct voltage for charging the battery B in the shaver SVR. The flyback converter comprises a transformer TR having a primary winding Lp connected across the direct voltage on the capacitor C2 via a switching transistor. The switching transistor forms part of a switched-mode power supply (SMPS) integrated circuit (IC) ICA of the type TEA 1400 from Philips Electronics. The transformer TR has a first secondary winding Ls1 whose terminals PSA and PSB can be coupled to corresponding terminals SVA and SVB of the shaver SVR via the two-wire cord (not shown in FIG. 2). The transformer TR has a second secondary winding Ls2, having a good magnetic coupling with the first secondary winding Ls1, as a result of which the voltages on the secondary windings Ls1 and Ls2 track one another in a satisfactory manner. The second secondary winding Ls2 serves for: (a) generating an operating voltage for the SMPS-IC ICA, for which the rectifier diode D4 and the smoothing capacitor C3 have been provided; (b) producing on the terminal VAT of the SMPS-IC ICA an indication about the voltage variation across the secondary winding Ls2; and (c) supplying a status signal STS to a status detector STD for the communication between the shaver SVR and the power supply unit PSU. The SMPS-IC ICA has an input for receiving an enable signal EN by means of which the flyback converter can be stopped. When the enable signal is low, the flyback converter is inoperative and the battery B is not charged. When the signal EN is high, the flyback converter is operative and the battery is charged with a current whose average value is determined by the design of the flyback converter. An enable signal EN having a comparatively high duty cycle, i.e. a signal which is comparatively often high, gives rise to a charging current of comparatively large average value, by means of which the battery can be charged rapidly (fast charge). An enable signal EN having a comparatively small duty cycle, i.e. a signal which is comparatively often low, gives rise to a charging current having a comparatively small average value, by means of which the battery can be charged slowly (trickle charge). The operation of a flyback converter is assumed to be known and for more details about the operation of the SMPS-IC TEA 1400 reference is made to the relevant documentation of Philips Electronics.

The shaver SVR comprises the battery B which, through a current sensing resistor R2 and a rectifier diode D5, is connected to the secondary winding Ls1 via the terminals SVA and SVB. The node between the diode D5 and the resistor R2 is connected to the shaver ground. This shaver ground is electrically isolated from the ground of the power supply unit PSU. The current Is through the battery B is measured by means of a comparator CMP, which integrates the voltage across the resistor R2 and compares it with a reference voltage from a reference voltage source REF. The result of the comparison is applied to a control unit CTL. By means of a status signal STS the control unit CTL temporarily turns on a switching transistor T if the average value of the charging current Is is too large or if the battery B is full. However, this short-circuit is allowed only during the breaks in the charging current Is. For this purpose, the no-current detector NCD has been provided, which monitors the voltage on the terminal SVB and which indicates to the control unit CTL when the flyback converter is idle. The voltage on the terminal SVN pulsates when the flyback converter is operative and is constant when the flyback converter is idle. The temporary short-circuit of the diode D5 results in the battery voltage appearing temporarily across the first secondary winding Ls1. The voltage pulse on the first secondary winding Ls1 as a result of the short-circuit of the diode D5 is transferred to the second secondary winding, where it can be detected by means of the status detector STD.

Figure 3:
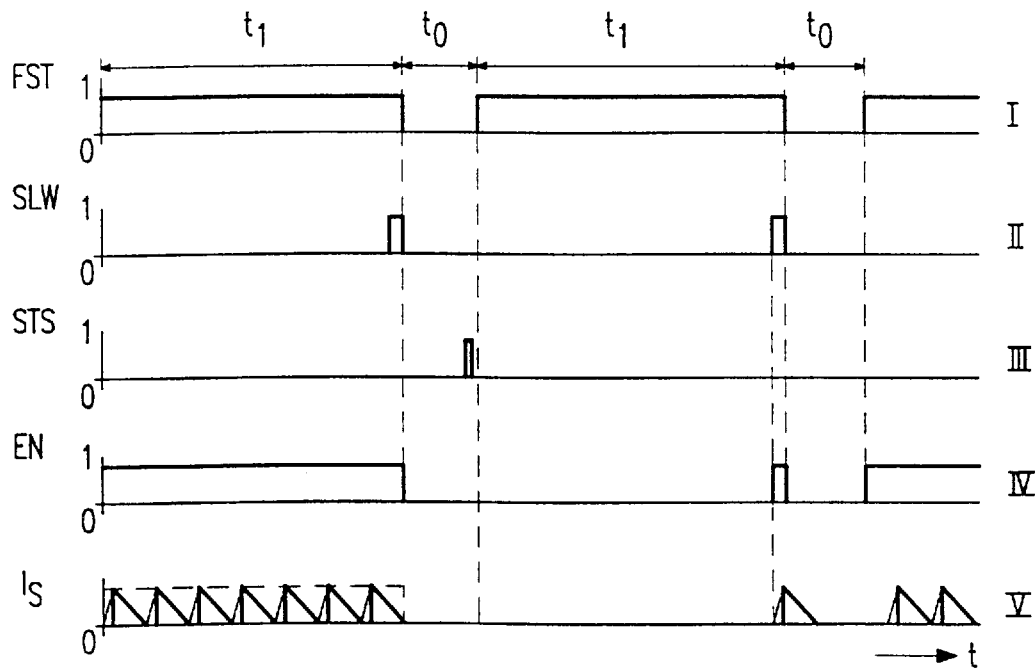
FIG. 3 is a waveform diagram showing signals which appear in the embodiment shown in FIG. 2.

FIG. 3 gives a waveform diagram of some signals appearing in the power supply system shown in FIG. 2. Along the time axis breaks have been plotted which have a length $t_0$ of 100 $\mu$s, during which the flyback converter is idle. The intervals between the breaks have a length $t_1$ of 900 $\mu$s, during which the flyback converter can operate. Obviously, the values of the length $t_0$ of the breaks and of the length $t_1$ of the intermediate intervals can be different; this depends inter alia on the period of one oscillation of the flyback converter. How long the flyback converter is operative during one interval $t_1$ or, in other words, how many oscillation periods of the flyback converter are admitted in the interval $t_1$, is determined by the enable signal EN shown in waveform diagram IV. Waveform diagram V shows the secondary current Is of the flyback converter. The enable signal EN can assume one of two types, i.e. FST (fast charge) as shown in waveform diagram I, or SLW (slow charge) as shown in waveform diagram II. Which of these two types is selected for the next interval $t_1$ depends on the value, waveform or content of the status signal STS transmitted by the shaver SVR in the preceding break $t_0$. In the present example an enable signal EN has been selected which, by default, takes the form of the signal FST, unless the status detector STD detects a voltage pulse STS during a break. In that case an enable signal EN of the type SLW is selected for the next interval.

If the enable signal EN is of the FST type, a comparatively large number of oscillation periods of the flyback converter fit in the interval $t_1$. For the sake of clarity, only seven periods are shown in the waveform diagram V, but in reality this number can be substantially larger. The average current supplied to the battery B is then large. If no voltage pulses are transmitted during the breaks the flyback converter will proceed, after each break, with intervals which accommodate comparatively many oscillation periods. The average value of the charging current, measured over a plurality of intervals $t_1$ and breaks $t_0$ is approximately ten percent smaller than the maximum current owing to the temporary interruptions during the breaks, which occupy ten percent of the total time. The average value of the charging current can be adapted in such manner that the battery B is charged with a rapid charging current of, for example, 1.2 A.

If during a break a voltage pulse STS is detected, an enable signal EN of the SLW type is selected in the next interval. The comparatively short time during which the enable signal EN is high can accommodate only a few oscillation periods of the flyback converter. The waveform diagram V shows one oscillation period but a larger number is also possible. The average charging current during this interval is much smaller. If in each break a voltage pulse STS would be detected, this small average charging current would be supplied in each subsequent interval. The average value of the charging current, measured over a plurality of intervals $t_1$ and breaks $t_0$, can be adapted in such a manner that the battery B is charged with a trickle charging current of, for example, 25 mA.

The values for the rapid charging current and the trickle charging current are merely given by way of example and in practice they depend on the capacity and type of the battery. It is also possible to overdimension the maximum charging current of the flyback converter in order to make the power supply system suitable for different battery types. The integrating comparator CMP monitors the average charging current by comparing the voltage across the resistor R2 with a reference voltage. The average charging current can be adjusted by varying the gain of the comparator or by varying the reference voltage. If the average charging current is exceeded, the control unit CTL applies a status signal STS to the gate of the transistor T during the next break, as a result of which a voltage pulse is transmitted to the power supply unit PSU. In the subsequent interval the flyback converter supplies a small charging current. The average charging current can now be controlled by switching between the large charging current (rapid charging) and the small charging current (trickle charging).

The full condition of the battery B is signalled by the battery management unit BMU. The control unit CTL will now supply a pulse to the power supply unit PSU during each break, as a result of which charging is effected with a small trickle charging current. In the simplest case, the battery management unit BMU is a comparator which compares the battery voltage with a reference voltage. However, more complex systems based on current measurement, time measurement, charge measurement, with or without correction for temperature and aging, and the like are also possible in order to monitor the degree of charging of the battery B.

Since by default the enable signal is of the FST type, an empty battery B will yet be charged rapidly. If SLW would have been the default type, the shaver would have to indicate by means of pulses that switching over to rapid charging is necessary. However, supplying pulses is not possible as long as the battery B is empty. As a result of this, the system would remain very long in the trickle charging mode in the case of an empty battery, causing the desired charging time to be exceeded. A default enable signal of the FST type thus precludes this situation.

The falling edge of the signal SLW coincides with the end of an interval $t_1$ and with the beginning of a break $t_0$. However, for the operation of the power supply system it is irrelevant where this falling edge is situated within the interval $t_1$, as long as the pulses of the signal SLW do not appear during the breaks.

Figure 4:
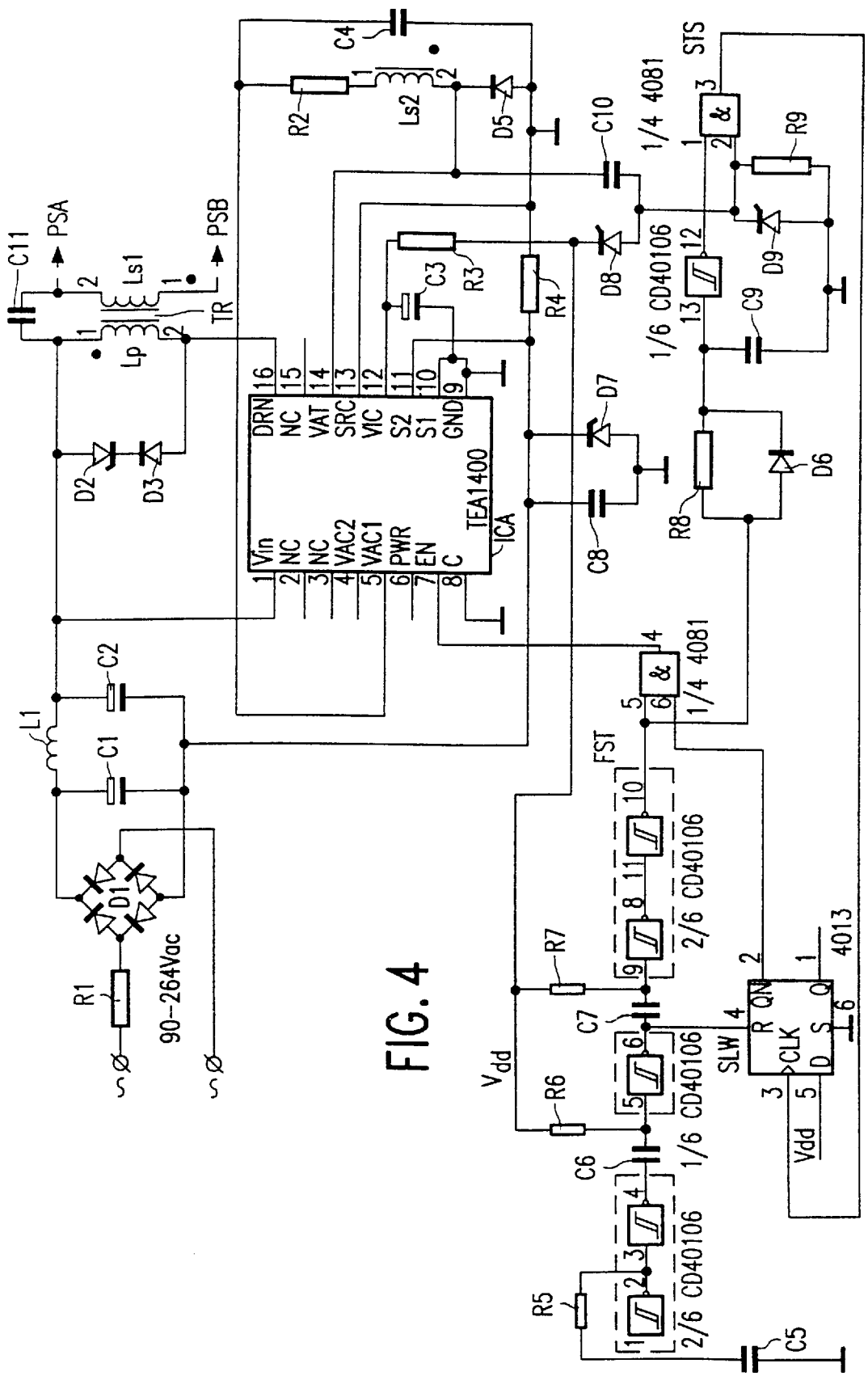
FIG. 4 is an electrical circuit diagram of the power supply unit of the power supply system shown in FIG. 2.

FIG. 4 shows the circuit diagram of the power supply unit PSU of FIG. 2. The components referenced R1, D1, C1, L1, C2, D2, D3, Tr, Lp, Ls1, Ls2 and ICA have the same purpose or function as the correspondingly referenced components in FIG. 2. The voltage across the second secondary winding Ls2 is rectified by means of a rectifier diode D5 and a smoothing capacitor C4, the node between the cathode of the diode D5 and the capacitor C4 forming the signal ground. From the rectified mains voltage on the terminal Vin of SMPS-IC ICA an internal supply voltage is derived, which is available on a terminal VIC of SMPS-IC ICA and which is buffered by means of a capacitor C3. The terminal VAC1 of SMPS-IC ICA is connected to the capacitor C4. The internal supply voltage VIC is derived from the voltage on the terminal VAC1 if the voltage across the capacitor C4 is sufficiently high during operation of the flyback converter. By means of a series resistor R3, a zener diode D7 and a smoothing capacitor C8 a supply voltage Vdd for the other circuits of the power supply unit PSU is derived from the voltage on the terminal VIC. The internal switching transistor of SMPS-IC ICA has its drain connection DRN connected to the primary winding Lp and its source connection SRC to ground. The current through the switching transistor is monitored by means of a sensing resistor R4 between the sensing terminals S1 and S2. The signals FST and SLW are generated by means of inverters of a hex Schmitt trigger CD40106. The first inverter with the resistor R5 and the capacitor C5 operates as a clock oscillator, whose output voltage is buffered by the second inverter. The duty cycle of the clock signal is 50%. The falling edges of the clock signal are differentiated by means of a capacitor C6 and a resistor R6 and are applied to a third inverter to derive the signal SLW with a duty cycle of approximately 2%. The falling edges of the signal SLW are once more differentiated by means of a capacitor C7 and a resistor R7 and are applied to a fourth inverter to derive a signal which is high for 100 $\mu$s. This signal is inverted by means of a fifth inverter, which supplies the signal FST. Thus, the breaks directly follow the falling edges of the signal SLW, as is shown in FIG. 3. This method of generating the signals FST and SLW has the advantage that the duty cycle is not dependent on the supply voltage Vdd and that the components used do not consume much current.

Figure 5:
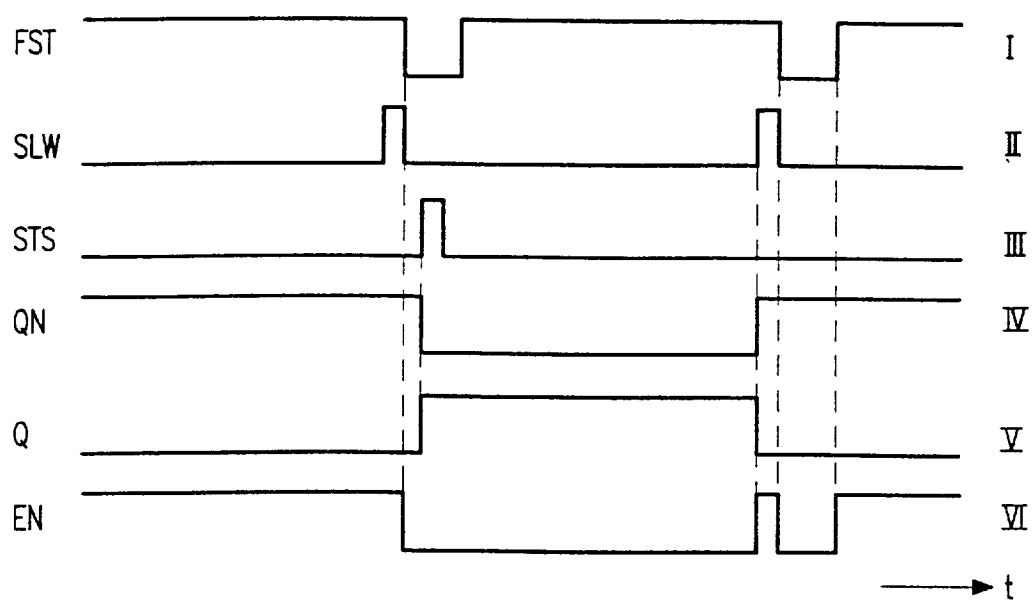
FIG. 5 is a waveform diagram showing signals which appear in the power supply unit shown in FIG. 4.

Selection from the signals SLW and FST is effected by means of a D flip-flop of the type HEF4013 and an AND gate of the type HEF4081. The D flip-flop is reset with the signal SLW and clocked with the signals STS, The D input being connected to the supply voltage Vdd and the set input being connected to ground. The output QN of the D flip-flop and the signal FST are applied to the AND gate which supplies the enable signal EN to the SMPS-IC ICA. FIG. 5 shows a waveform diagram of the signals FST, SLW, STS, QN and EN.

The status signal is detected by means of the components around the sixth inverter of the hex Schmitt trigger and an AND gate of the type HEF4081. The voltage pulses generated in the shaver during the breaks appear across the second secondary winding Ls2 and are measured on the node between the secondary winding Ls2 and the diode D5. The pulses are available across a resistor R9, which is connected to the node via a capacitor C10. The voltage across R9 is limited by means of zener diodes D8 and D9. The voltage pulses across the resistor R9 are applied to a first input of the AND gate. A second input of the AND gate receives an inverted FST signal, whose falling edge is delayed by means of a resistor R8, a diode D6 and a capacitor C9 in order to suppress undesirable effects of any additional oscillation cycles which may occur after the enable signal EN has become zero. When the signal FST goes low, i.e. at the beginning of a break, the capacitor C9 will discharge comparatively slowly via the resistor R8. At the end of the break the signal FST goes high and the capacitor C9 will be charged comparatively rapidly via the diode D6.

Figure 6:
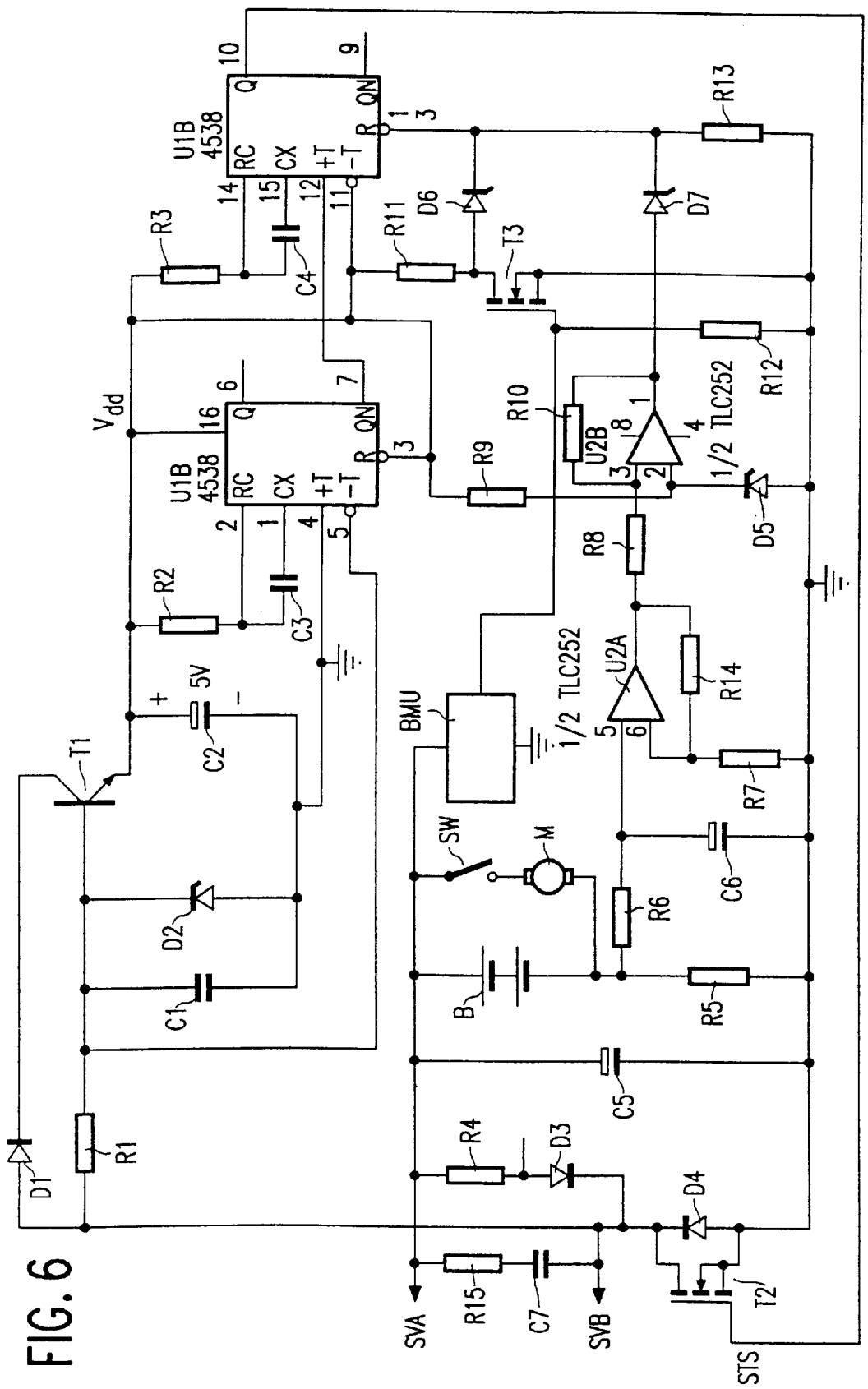
FIG. 6 is an electrical circuit diagram of the apparatus with a rechargeable battery of the power supply system shown in FIG. 2.

FIG. 6 shows the circuit diagram of the shaver SVR. The battery B, which powers a motor M via a switch SW, is connected to the first secondary winding Ls1 of the power supply unit PSU, in series with a current sensing resistor R5 and a rectifier diode D4, via the terminals SVA and SVB, the node between the resistor R5 and the cathode of the diode D4 forming the signal ground of the shaver SVR. An NMOS transistor T2 is connected in parallel with the diode D4 and its gate is driven by the status signal STS. The no-current detector NCD of FIG. 2 is constructed by means of a retriggerable one-shot U1A of the type HEF4538, which is triggered by a falling edge on the input −T. The trigger signal is derived from the voltage on the terminal SVB between the cathode of the diode D4 and the first secondary winding Ls1. This voltage pulsates when the flyback converter is operative and is equal to the voltage of the battery B when the flyback converter is idle. The pulsating voltage is limited by a series resistor R1, a zener diode D2, and a capacitor C1 parallel to the zener diode D2. The voltage across the parallel arrangement of the zener diode D2 and the capacitor C1 is buffered by an NPN transistor T1 having its collector connected to the terminal SVB via a diode D1, having its base connected to the zener diode D2, and having its emitter connected to a buffer capacitor C2. The voltage across the capacitor C2 functions as the local supply voltage Vdd of the shaver SVR. Upon a falling edge the output Q of the one-shot U1A goes high and the output QN goes low for a time T (approximately 80 μs) determined by the resistor R2 and the capacitor C3, which are connected to the inputs RC and CX of the one-shot.

The average charging current is monitored by means of an integrating amplifier U2A and a comparator U2B, both of the type TLC252. The voltage across the current measuring resistor R5 is filtered by means of a low-pass filter R6/C6 and is amplified by the amplifier U2A, the gain factor being adjustable by means of a feedback resistor R14 to a value adapted to the type of battery. The comparator U2B compares the output voltage of the amplifier U2A with a reference voltage generated by a zener diode D5, which receives a bias current from the voltage supply Vdd via a resistor R9. The output of the comparator is high if the applied voltage is higher than the reference voltage. In that case the reset input R of a second retriggerable one-shot U1B of the type HEF4538 is pulled high via a Schottky diode D7. The battery voltage of the battery B is monitored by the battery management unit BMU, which signals a full battery with a low signal, which is inverted by an NMOS transistor T3 and a resistor R11 in series with the drain of the transistor T3. The signal on the drain of the transistor T3 is also applied to the reset input of the one-shot U1B via a Schottky diode D6. The output Q of the one-shot U1B drives the gate of the transistor T2 by means of which the diode D4 is temporarily short-circuited during the breaks if a voltage pulse is to be applied to the power supply unit. The duration of the voltage pulse is determined by a resistor R3 and a capacitor C4 connected to the terminals RC and CX of the one-shot U1B. A voltage pulse is generated only if the reset input R of the one-shot U1B is high, i.e. if the average current is too large or if the battery is full.

Figure 7:
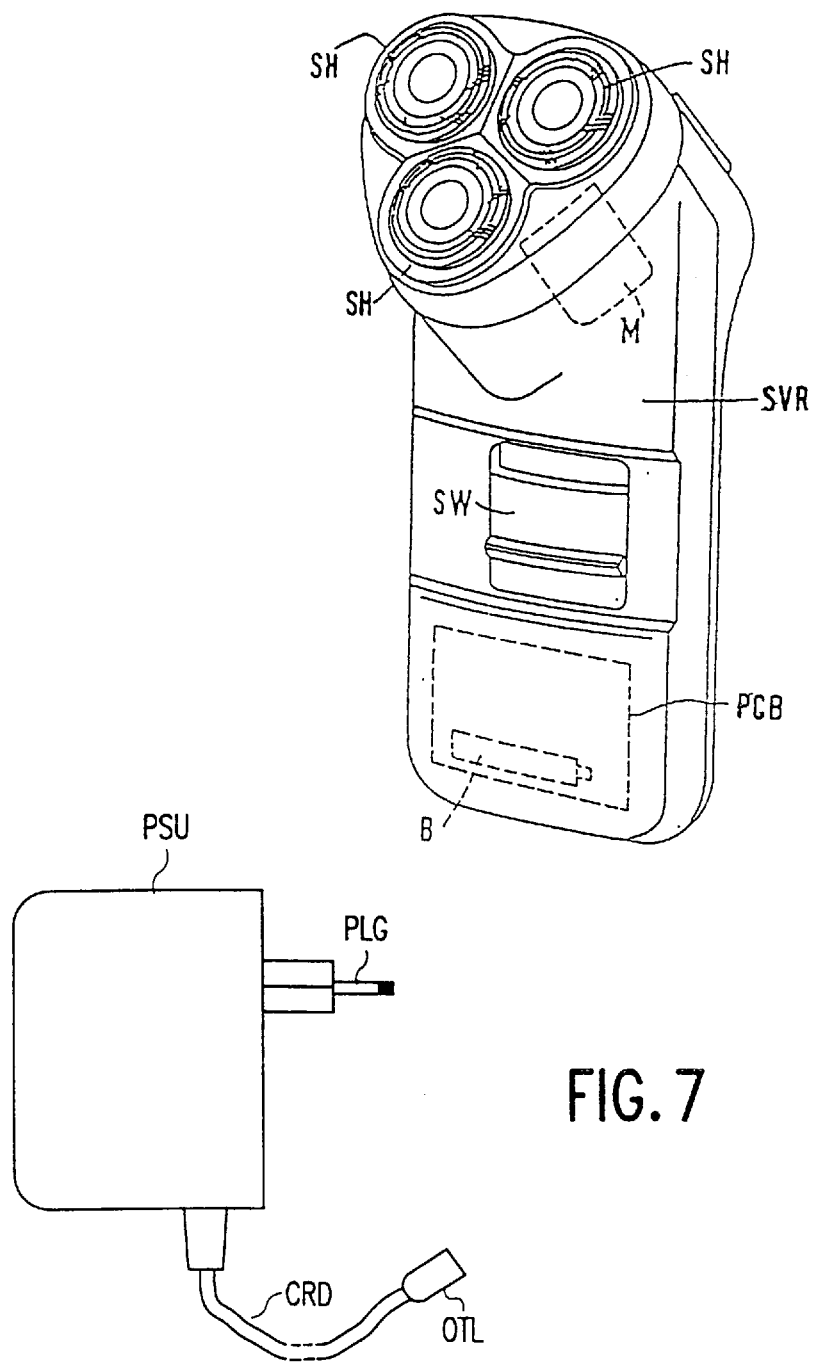
FIG. 7 shows an embodiment of a power supply system in accordance with the invention, in which the apparatus with rechargeable batteries is a shaver.

FIG. 7 shows the shaver SVR of FIG. 1 with the motor M which drives the shaving heads SH. The motor M is started with the switch SW, which connects the motor M to the rechargeable battery B, which together with the other electronic components, for example those of the circuit shown in FIG. 6, is accommodated on a printed circuit board PCB in the shaver SVR. FIG. 7 further shows the power supply unit PSU of FIG. 2, which has an integrated mains plug PLG and the two-wire connecting cord CRD, which can be coupled to an inlet (not shown) of the shaver SVR by means of an outlet OTL.

I claim:

1. A power supply system comprising: an apparatus (SVR) with a rechargeable battery (B), and a power supply unit (PSU) with a switched-mode power supply (DCC), which power supply unit (PSU) can be coupled to the apparatus (SVR) to supply current to the apparatus (SVR), characterized in that the power supply unit (PSU) comprises means (ICA, EN) for stopping the switched-mode power supply (DCC) during breaks in which no current is supplied to the apparatus (SVR); the apparatus (SVR) comprises means for detecting the breaks in the current supply and means (T, CTL) for transmitting a status signal (STS) to the power supply unit (PSU) during the breaks; and the power supply unit (PSU) comprises means (STD) for detecting the status signal (STS) during the breaks and means (ICA) for changing the current intensity of the current in response to the status signal.

2. A power supply system as claimed in claim 1, characterized in that the switched-mode power supply comprises a flyback converter (ICA) with a transformer (TR), of which transformer (TR) a secondary winding (Ls1) can be coupled to at least the rechargeable battery (B) via a rectifier diode (D5).

3. A power supply system as claimed in claim 2, characterized in that the apparatus (SVR) comprises an electronic switch (T) for short-circuiting the rectifier diode (D5) during the breaks in order to generate a pulse by way of status signal.

4. A power supply system as claimed in claim 3, characterized in that the flyback converter is adapted to supply a comparatively small current (SLW) after detection of the pulse and to supply a comparatively large current (FST) in the absence of the pulse.

5. A power supply system as claimed in claim 4, characterized in that the apparatus (SVR) comprises means (CMP, REF) for measuring an average current to the battery (B) and means (CTL) for activating the electronic switch (T) when the average value exceeds a threshold value.

6. A power supply system as claimed in claim 4, characterized in that the apparatus (SVR) comprises means (BMU) for measuring a charging condition of the battery (B) and means (CTL) for activating the electronic switch (T) when a predetermined value of the charging condition is reached.

7. A power supply system as claimed in claim 4, characterized in that the comparatively small current is adequate for trickle-charging of the battery (B).

8. A power supply unit (PSU) with a switched-mode power supply (DCC) which can be coupled to an apparatus (SVR) with a rechargeable battery (B) for supplying current to the apparatus (SVR), characterized in that the power supply unit (PSU) comprises: means (ICA, EN) for stopping the switched-mode power supply (DCC) during breaks in which no current is supplied to the apparatus (SVR), means (STD) for detecting a status signal transmitted to the power supply unit (PSU) by the apparatus (SVR) during the breaks, and means (ICA) for changing the current intensity of the current in response to the status signal.

9. An apparatus (SVR) with a rechargeable battery (B), which can be coupled to a power supply unit (PSU) with a switched-mode power supply (DCC) for supplying current to the apparatus (SVR), characterized in that the power supply unit (PSU) comprises means (ICA, EN) for stopping the switched-mode power supply (DCC) during breaks in which no current is supplied to the apparatus (SVR); the apparatus (SVR) comprises means for detecting breaks in the current supply from the power supply unit (PSU), and means (T, CTL) for transmitting a status signal (STS) to the power supply unit (PSU) during the breaks to change, in response to the status signal received by the power supply unit (PSU), the current intensity of the current to be supplied by the power supply unit (PSU).

10. An electric shaver (SVR) comprising: a rechargeable battery (B), an electric motor (M), a switch (SW) for connecting the motor (M) to the battery (B), and a power supply system as claimed in claim 1, for charging the battery (B) and/or powering at least the motor (M).

* * * * *